July 26, 1949.                J. V. THOMPSON                2,477,469
                        ARSENICAL GOLD ORE TREATMENT
Filed June 24, 1946                                     3 Sheets-Sheet 1

INVENTOR:
JAMES V. THOMPSON
BY
ATTORNEY

*INVENTOR:*
JAMES V. THOMPSON
BY
Arthur Middleton
*ATTORNEY*

Patented July 26, 1949

2,477,469

UNITED STATES PATENT OFFICE 2,477,469

ARSENICAL GOLD ORE TREATMENT

James V. Thompson, Calhoun, Ga., assignor to The Dorr Company, New York, N. Y., a corporation of Delaware Application June 24, 1946, Serial No. 678,772

4 Claims. (Cl. 75—105)

This invention relates to the treatment of arsenical gold ores for the recovery of the gold values therefrom. Such gold values are usually recovered from roasted ore by the cyanide process which is based on the fact that gold is dissolved by dilute solutions of sodium cyanide. After the gold has been dissolved as $NaAu(CN)_2$, it is recovered as metallic gold by precipitation such as with zinc dust.

However, when arsenical ores and concentrates are roasted, residual amounts of arsenic trioxide remain in the calcines. This arsenic is somewhat water-soluble and forms $H_3AsO_3$ in the solutions. This $H_3AsO_3$ reacts to consume cyanide and thus deters or inhibits cyaniding.

Further, when the solutions are separated from the pulp for precipitation, arsenic prevents precipitation by reacting with the zinc whereby the zinc becomes coated with arsenic which results in stoppage of precipitation of gold. So it is an object of this invention to devise ways and means for removing arsenic from such aurocyanide solutions in a manner whereby the precipitation of the gold from solution phase can proceed efficiently. Another important object of this invention is to remove at least some arsenic from the roasted ore prior to its cyanidation.

The invention revolves about the features of (1) removing some arsenic from the roasted or calcined arsenical gold ore ahead of the cyanide treatment stage, and (2) removing additional arsenic after cyanidation prior to precipitation of gold and ahead of final thickening. The latter feature is by far the more important. A further feature of the invention comprises selectively rendering arsenic into solution while leaving other constituents of the ore in solid phase ahead of the cyanidation stage, and removing from the uncyanided ore a significant quantity of such dissolved arsenic by washing.

A still further feature of the invention is treating the cyanided ore having gold in solution (from which some dissolved arsenic has been removed) to precipitate selectively arsenic in solid phase from the gold-bearing solution, and removing such precipitated arsenic. Still further features of the invention comprise the control, within critical limits, of the pH in the two arsenic treatment stations or stages.

Figure 1:
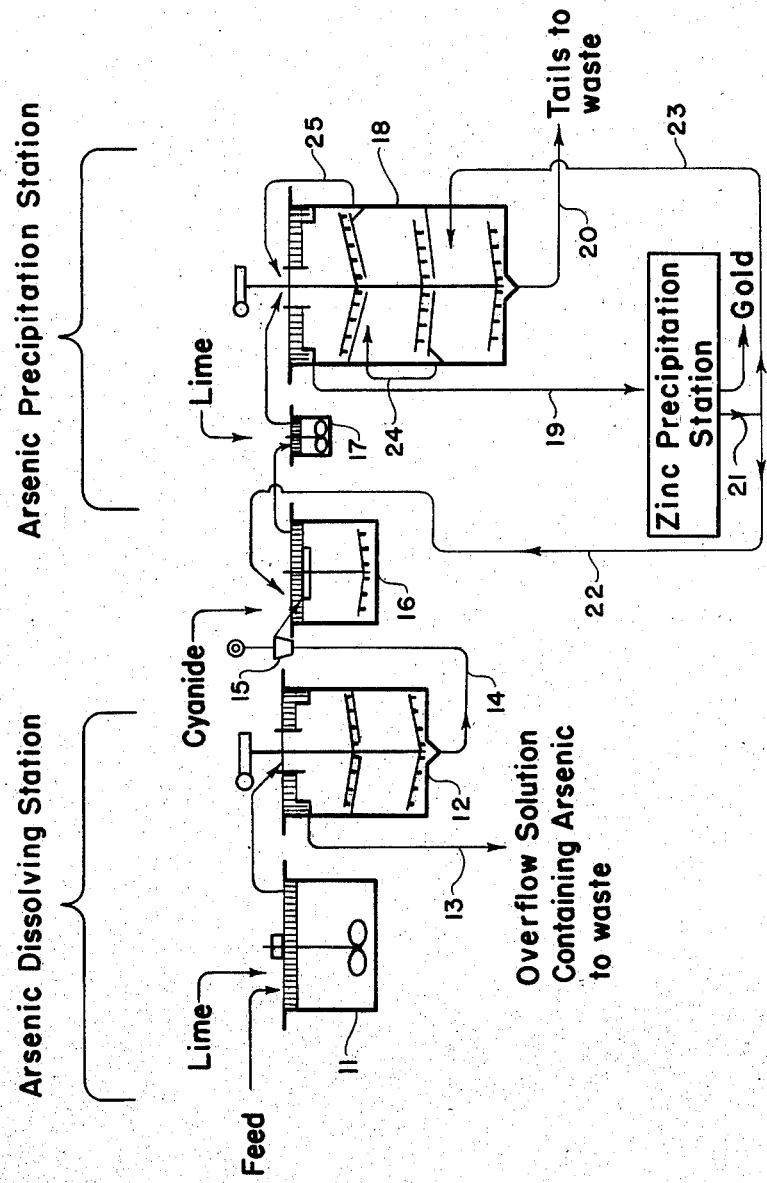
Figure 2:
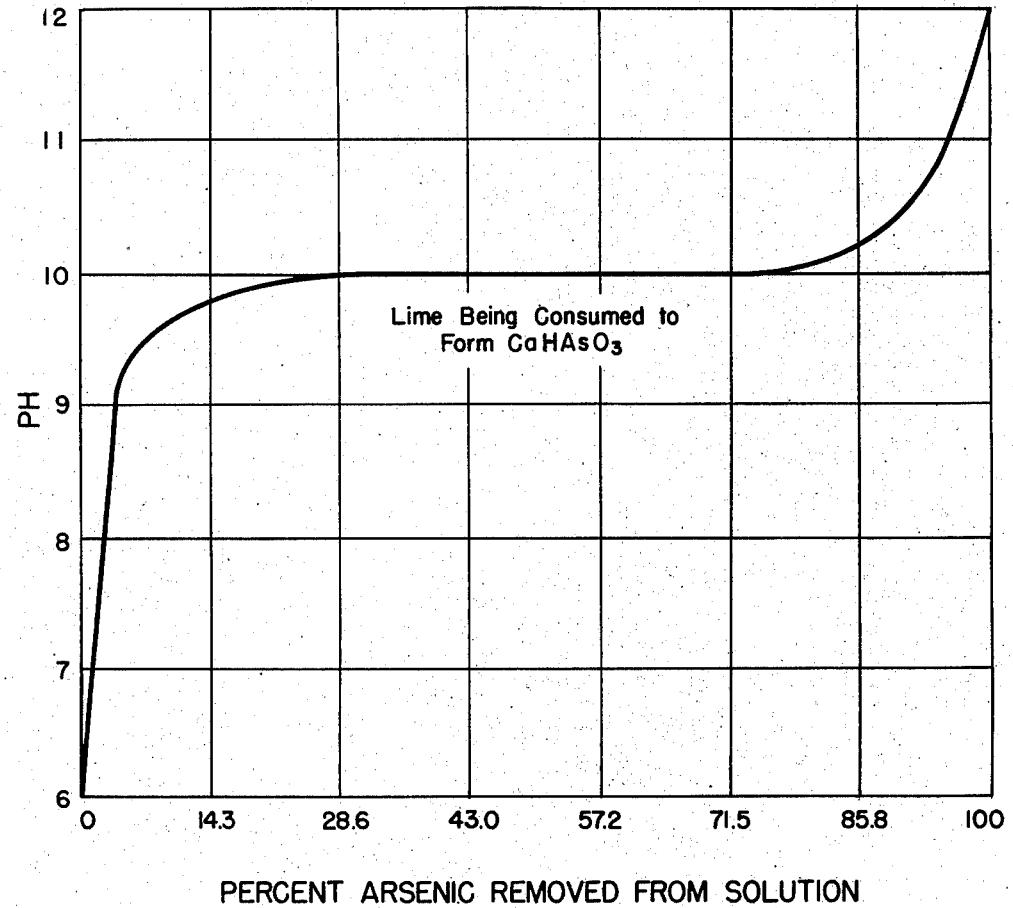
Figure 3:
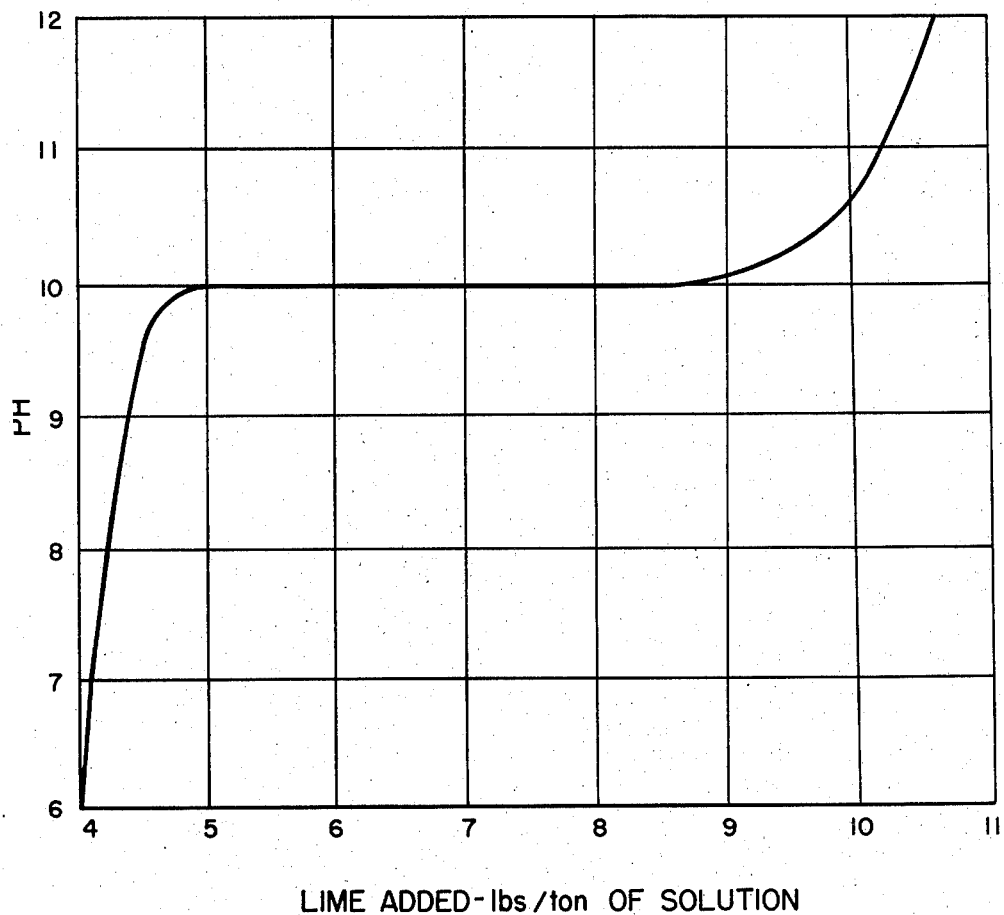

The invention may be practiced in a system or flow-sheet of apparatus or treatment stations which are illustrated, by way of example only, in the accompanying drawings wherein such apparatus or stations are shown diagrammatically in Fig. 1. Fig. 2 is a graph showing the effect of treating a solution of the type that flows from the cyanide agitator 16, with lime at 17 and observing the relationship between pH and percent arsenic removed at various values of pH. Fig. 3 is a graph showing the relationship of pH to lime addition using the solution as discharged from the cyanide agitator 16.

In the flow-sheet of Fig. 1, there is shown an arsenic dissolving station which comprises an agitator 11 to which ground calcined ore is fed along with some pH adjusting alkaline reagent having the alkalizing effect of lime. Calcines and water are supplied to the agitator 11 in proportions of from 10 to 1, up to 20 to 1. From thence the mixture goes to a thickener, preferably a tray thickener 12 from which effluent is overflowed to discard through pipe 13 and from which underflow passes through pipe 14 to pump 15. From the pump 15 the mixture flows to a cyanidation station comprising a second agitator which is known as the cyanide agitator, wherein cyanide is added to dissolve gold values from the ore. From here, the mixture goes to an arsenic precipitation station comprising a smaller agitator 17 where lime is added and from thence to a multi-compartment tray thickener 18 from which effluent overflows through pipe 19 and underflow passes through pipe 20. Barren cyanide solution from the precipitation station is supplied to the system through pipe 21, through branch line 22 thereof to the cyanide agitator 16 and through branch line 23 to the lowest compartment of the tray thickener 18. In the tray thickener 18, a recirculation pipe 24 is provided for recirculating clarified liquor from the bottom compartment to the second compartment, and recirculation pipe 25 is provided for recirculating clarified liquor from the second compartment to the top compartment. Such thickeners are well-known in the gold ore treating art.

In operation, the ground ore and water is supplied as feed to the agitator 11 along with lime or other alkalizing agent in a quantity such that the pH of the mixture being agitated is maintained to lie in a range up to substantially 9.5 to 10 whereby, within such range, arsenical constituents of the ore tend to pass into solution phase in significant quantities and precipitation thereof is minimized. This dissolving action seems to be selective so that the arsenic goes into solution while the gold values remain in solid phase.

The resulting mixture is passed from the agitator to a washing thickener 12 of the usual tray type, wherein liquor (including the dissolved arsenic) overflows to waste as effluent along flowpath or pipe 13. Underflow comprising a pulp of thickened suspended solids (including gangue of the ore and the gold values) from which the effluent has been removed, passes from the thickener 12 through pipe 14. The agitator 11 and the thickener 12 comprise what may be termed the arsenic dissolving station.

From the arsenic dissolving station, the pulp inherently containing some residual arsenic in solution passing through pipe 14 is pumped by pump 15 and supplied to a usual cyanide agitator 16 to which a gold-dissolving cyanide compound is supplied to dissolve selectively gold-values from the pulp while leaving gangue constituents in solid phase. This pulp of solid gangue particles and gold in solution is then passed to an arsenic precipitation station comprising a smaller agitator 17 to which lime is added, and a cyanide tray thickener 18.

In the small agitator 17 to which is supplied the cyanided pulp comprising solid gangue particles, gold in solution, and some residual arsenic in solution, sufficient lime is added in quantity so that the pH of the pulp in that agitator lies in a range of from substantially 11.8 to substantially 12.2 whereupon it is found that arsenical constituents in solution phase are precipitated into solid phase and the solid arsenical particles become admixed with the gangue particles in the gold-bearing solution. This pulp or admixture is then supplied to the cyanide thickener 18 which is of the tray type usual for such purpose, with the result that liquid, containing gold in solution, is decanted therefrom through effluent pipe 19 while the suspended solids containing gangue and solid arsenic, pass from the thickener as thickened underflow through pipe 20 that leads them to waste. The decanted liquor in pipe 19 is then passed to a usual gold-precipitating station where it is precipitated by zinc or other precipitant. This decanted liquor has a pH of substantially 12 and contains only a trace of arsenic which is not enough to interfere significantly with the precipitation of the gold values. Barren cyanide solution recovered from the gold precipitation station can be re-supplied to the system through inlet pipe 21 which may branch to supply some of the cyanide to the cyanide agitator 16 and some through pipe 23 to the bottom compartment of the cyanide thickener 18 to exert a washing effect and displace gold-bearing cyanide solution. Liquor in the various compartments of the thickener 18 may be recirculated, as shown, through pipes 24 and 25 respectively.

Removal of arsenic by adjusting the pH in the pre-cyanide washing or arsenic dissolving station is of use primarily because it decreases the load of precipitated arsenic in the washing thickener. This step is very desirable but not essential. The essential step is the removal of arsenic in the arsenic precipitation station because an insoluble calcium-arsenic compound is formed at the pH used. This precipitate impairs thickener operation. Hence, the more arsenic removed by solution, the less remanis to be precipitated.

Whereas, alkaline agents other than lime, may be used in the arsenic dissolving station, only lime can be used in the arsenic precipitation station. This became known to the patentee through an unexpected discovery. The discovery was that if clear lime water be added gradually to a clear trivalent arsenic solution, nothing happens until the pH rises above 9.5, whereupon as 10. is approached, a white precipitate appears.

The graph of Fig. 2 shows that when solutions coming from the cyanide agitator 16 are treated with lime at 17 the pH rises sharply to about 9.5 without any significant precipitation of arsenic. At 10 additional lime causes precipitation of arsenic as $CaHAsO_3$ without any rise of pH. When about 85% of the arsenic is thus removed as insoluble $CaHAsO_3$, the pH starts to rise again until at pH 12 almost all arsenic is found to have been precipitated.

Fig. 3 shows data plotted from tests using the same solutions from 16 and lime treated at 17. This graph shows that the pH rises to 10 with very little lime. At 10 the pH shows no rise as more lime is added. After reaching pH 10 the precipitation of the $CaHAsO_3$ starts and additional lime added thereafter is used in supplying calcium ions for the formation of $CaHAsO_3$. When about 85% of the arsenic is thus removed, additional lime then raises the pH above 10, and, as demonstrated by Fig. 2, at pH 12 almost no arsenic remains. The arsenic seems to be precipitated as insoluble calcium acid arsenite ($CaHAsO_3$) which goes out with the underflow 20 in the washing thickener 18 in the arsenic precipitation station. Such calcium acid arsenite is believed to be a new product. The graph shows why the pH should not rise above 10 in the arsenic dissolving station but should be substantially above that in the arsenic precipitation station. About 50% of the arsenic is removed in each station. Indeed it shows how, in the dissolving station, to maximize the rendering into solution phase of the arsenic while minimizing precipitation or re-precipitation thereof, and how, in the precipitation station, to maximize precipitation of arsenic while minimizing continued solubility thereof.

I claim:

1. In the process of recovering gold-bearing values from roasted arsenical gold ores, the steps which comprise first adding an alkaline reagent such as lime to a mixture of ground ore and water to render arsenical constituents of the ore selectively into solution phase while minimizing precipitation thereof, washing such solution phase arsenic from the ore, cyaniding the ore to render gold thereof into solution phase, selectively precipitating remaining arsenical constituents as an arsenite by adding lime, removing such precipitated arsenical constituents from their mother liquor, and then precipitating gold values from the remaining liquor.

2. The process according to claim 1, wherein the solid phase arsenic is removed in a thickening operation.

3. The process according to claim 1, wherein the solid phase arsenic removed has the chemical formula $CaHAsO_3$.

4. The process of treating roasted arsenical gold-bearing ores, which comprises agitating a mixture of ground ore, water and an alkaline reagent such as lime while controlling the pH of the mixture to lie in a basic range up to substantially from 9.5 pH to 10.0 pH for selectively rendering arsenical constituents of the ore into solution while minimizing precipitation thereof and maintaining the gold constituents of the ore in solid phase; washing dissolved arsenic from the ore; mixing such washed ore with cyanide for selectively rendering gold constituents thereof into solution; mixing such resulting mixture with lime while controlling the pH of the mixture to lie in a range of substantially from 11.8 pH to substantially 12.2 pH for selectively precipitating arsenical constituents remaining in the mixture into a solid phase arsenite while leaving the other constituents of the mixture substantially unchanged; removing solid phase material from the latter mixture; and finally precipitating gold values from the resulting liquor.

JAMES V. THOMPSON.

REFERENCES CITED

The following references are of record in the file of this patent:

UNITED STATES PATENTS

| Number | Name | Date |
|---|---|---|
| 1,257,612 | Kirchen et al. | Feb. 26, 1918 |
| 1,700,756 | Altwegg et al. | Feb. 5, 1929 |

OTHER REFERENCES

"The Cyanide Handbook," by Clennell, 1915, pages 375 and 376.

"Comprehensive Treatise on Inorganic and Theoretical Chemistry," by Mellor, vol. 9, 1929; page 124.